J. I. ARBOGAST.
METHOD OF PRODUCING WIRE GLASS ARTICLES.
APPLICATION FILED OCT. 4, 1907.
916,250.
Patented Mar. 23, 1909.
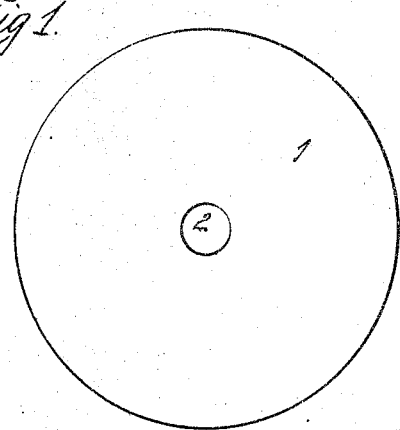
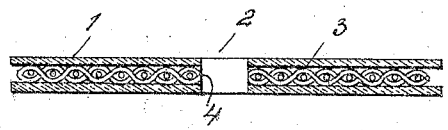
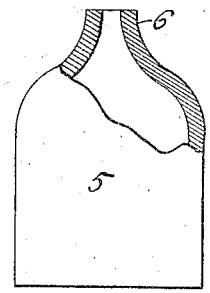
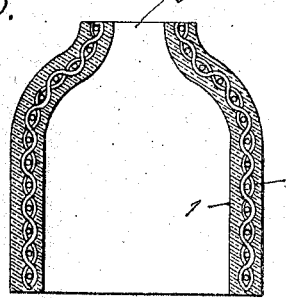
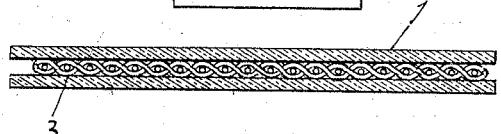
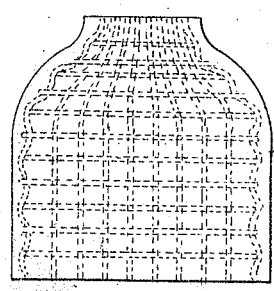
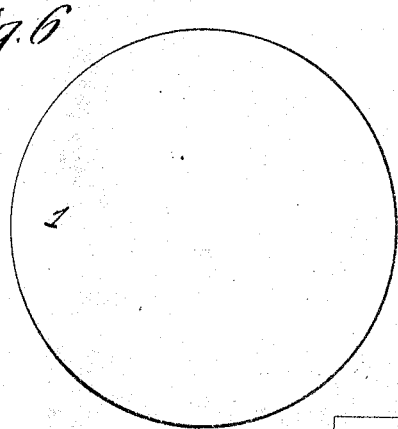
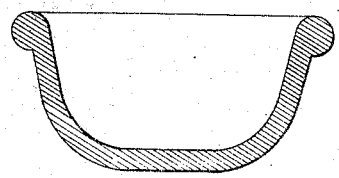
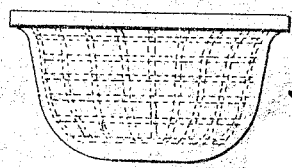
Witnesses
A. H. Raboig
H. H. Butler
Inventor
John I. Arbogast
By
Attorneys

UNITED STATES PATENT OFFICE.

JOHN I. ARBOGAST, OF PITTSBURG, PENNSYLVANIA, ASSIGNOR OF ONE-HALF TO HENRY I COLLINS, OF PITTSBURG, PENNSYLVANIA.

METHOD OF PRODUCING WIRE-GLASS ARTICLES.

No. 916,250.   Specification of Letters Patent.   Patented March 23, 1909.

Application filed October 4, 1907. Serial No. 395,826.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Methods of Producing Wire-Glass Articles, of which the following is a specification, reference being had therein to the accompanying drawing.

This invention relates to a method of producing wire glass articles, and its primary object is to provide a novel method whereby a great variety of articles may be inexpensively formed from wire glass.

The improved method is especially designed for the production of wire glass shades for electric and other lights, such as arc-shades, cone-shades and dome-shades; and also for producing various domestic utilities, as sanitary basins, bowls and the like.

Generally stated, the improved method consists in assembling or placing together two plates or layers of glass of suitable size and shape to form the desired article, with an interposed layer of wire mesh; placing the assembled layers upon a pattern or former, and then subjecting them to heat within a suitable furnace to cause the glass to collapse and conform to the shape or contour of the pattern or former. After the article thus formed has cooled, the pattern or former is removed, leaving a complete article of glass with wire mesh embedded therein.

The invention will be fully described hereinafter in connection with the accompanying drawing which forms a part of this specification, and its novel features set forth in the appended claims.

In the drawing: Figure 1 is a top plan view of one of the glass plates or layers employed, Fig. 2 is a central vertical section on an enlarged scale of the assembled layers of glass and wire mesh, Fig. 3 is a side elevation of a pattern or former adapted for use with the layers shown in Figs. 1 and 2, Fig. 4 is a side view of a completed shade corresponding to the shape of the former shown in Fig. 3, Fig. 5 is a vertical section of the same, Fig. 6 is a plan of another form of glass plate or layer, Fig. 7 is a section of two of the layers shown in Fig. 6 with an interposed layer of wire mesh, Fig. 8 is a sectional view of a pattern or former capable of use with the layers shown in Fig. 7 and Fig. 9 is a side elevation of the completed article made upon the former shown in Fig. 8.

Referring to Figs. 1 and 2 the reference numeral 1 designates circular plates of glass, each formed with a central circular opening 2. Between the two glass plates or layers 1 is interposed a circular layer 3 of wire mesh corresponding in size to the glass layers and formed with a central opening 4 registering with the openings 2 in the glass layers. The assembled layers 1 and 3 are placed upon the dome-shaped pattern or former 5 of metal or other suitable material, with the neck 6 of the former extending through the central opening in the layers. The former 5, with the assembled layers thus applied, is then placed within the amalgamating oven or furnace, which is provided with a traveling table and subjected first to a gradually increasing heat, then to an annealing heat which causes the glass layers to collapse and drop down over the outer surface of the former to conform to the shape thereof and finally to a gradually decreasing heat which insures a gradual cooling of the glass. After the article thus formed has cooled sufficiently, the former 5 is withdrawn, leaving as a product a perfectly shaped shade 7 of wire glass. The same method is employed in connection with the glass plates or layers shown in Figs. 6 and 7 and the former 8 shown in Fig. 8. It will be apparent that the product 9 in this instance will conform to the shape of the former 8, the glass collapsing upon the inner surface of the pattern or former instead of upon the outer side as is the case when the former 5 and layers 1 and 3 are used.

In the production of certain articles by my improved method some manipulation of the glass may be necessary as it passes through the oven. This can be effected by tools inserted through openings in the oven walls.

The above description, together with the two patterns or formers shown will suffice to enable those skilled in the art to understand my improved method, but it is obvious that the invention is not restricted to the use of the formers and circular glass plates and layers here shown, but comprehends and includes the production of wire glass articles of a great variety of shapes, and the employment of formers or patterns of any desired shape or contour. I would therefore have it understood that the invention includes all such variations and modifications in the shape and form of the glass and wire layers, and of the patterns or formers as may fall within the terms and scope of the claims.

Having fully described my invention what I claim and desire to secure by Letters Patent, is, 1. The herein-described method of producing wire glass articles, consisting of assembling two layers of glass of the required size and shape to form the article to be produced, with an interposed layer of wire mesh; placing said layers of glass and wire mesh upon a former; and then subjecting said layers to heat within a furnace to cause them to amalgamate, and during amalgamation to assume the shape of the former.

2. The hereindescribed method of producing wire glass articles, consisting of assembling two independent layers of glass of predetermined size and shape, with an interposed layer of wire mesh of similar size and shape, placing said layers of glass and wire mesh upon a pattern or former; then subjecting them to heat to cause the layers to collapse and amalgamate upon the pattern or former and conform to the shape thereof; and finally removing the former after the glass has cooled.

3. The herein-described method of producing wire glass articles consisting of assembling two layers of glass of pre-determined size and shape, with an interposed layer of wire mesh; placing said layers upon a pattern or former, then subjecting said layers first to a gradually increasing heat, then to an annealing heat, and finally to a gradually decreasing heat whereby the assembled layers of glass and wire mesh are caused to conform to the shape of the pattern or former and amalgamate during such shaping.

4. The herein-described method of producing wire glass articles, consisting of assembling two circular plates or layers each formed with a central opening, with an interposed circular layer of wire mesh also formed with a central opening registering with the openings in the glass layers; placing said assembled layers of glass and wire mesh upon a pattern or former, and then subjecting them to heat to cause the glass to collapse upon the pattern or former and assume the shape thereof.

5. The herein-described method of producing wire glass articles, consisting of assembling two circular glass plates or layers each formed with a central circular opening, with an interposed layer of wire mesh also formed with a circular central opening registering with the openings in the glass layers, placing said assembled layers of glass and wire mesh upon a pattern or former, and then subjecting them first to a gradually increasing heat, then to an annealing heat to cause the glass to collapse and conform to the shape of the pattern or former and finally to a gradually decreasing heat.

6. The herein described method of producing wire glass articles, consisting of assembling two separate plates or layers of glass of the required size and shape to produce the desired article with an interposed layer of wire mesh, arranging said asesmbled layers upon a pattern or former and then subjecting them to heat to cause the glass and wire mesh to collapse and amalgamate and during amalgamation conform to the surface contour of the pattern or former.

In testimony whereof I affix my signature in the presence of two witnesses.

JOHN I. ARBOGAST.

Witnesses:
F. C. ZERCHER,
F. O. McCLEARY.